US012022960B2

United States Patent
Ruzicka

(10) Patent No.: US 12,022,960 B2
(45) Date of Patent: Jul. 2, 2024

(54) FURNITURE, CHARGING PORT ASSEMBLY, AND METHOD OF ASSEMBLING SAME

(71) Applicant: Knoll, Inc., East Greenville, PA (US)

(72) Inventor: Pavel Ruzicka, Pennsburg, PA (US)

(73) Assignee: Knoll, Inc., East Greenville, PA (US)

(*) Notice: Subject to any disclaimer, the term of this patent is extended or adjusted under 35 U.S.C. 154(b) by 203 days.

(21) Appl. No.: 17/732,841

(22) Filed: Apr. 29, 2022

(65) Prior Publication Data

US 2022/0354260 A1   Nov. 10, 2022

Related U.S. Application Data

(60) Provisional application No. 63/183,863, filed on May 4, 2021.

(51) Int. Cl.
| | |
|---|---|
| A47C 7/54 | (2006.01) |
| A47C 7/62 | (2006.01) |
| A47C 7/68 | (2006.01) |
| A47C 7/72 | (2006.01) |
| A47C 17/00 | (2006.01) |
| H02G 3/04 | (2006.01) |

(52) U.S. Cl.
CPC ............... *A47C 7/72* (2013.01); *A47C 7/541* (2018.08); *A47C 7/62* (2013.01); *A47C 7/68* (2013.01); *A47C 17/00* (2013.01); *H02G 3/0418* (2013.01); *H02G 3/0487* (2013.01)

(58) Field of Classification Search
CPC .... A47C 7/72; A47C 7/62; A47C 7/68; A47C 7/541; A47C 7/54
See application file for complete search history.

(56) References Cited

U.S. PATENT DOCUMENTS

| | | | |
|---|---|---|---|
| 4,325,597 A | 4/1982 | Morrison | |
| 4,619,486 A | 10/1986 | Hannah et al. | |
| 4,950,839 A | 8/1990 | Quinn et al. | |
| 5,048,698 A | 9/1991 | Konrad | |
| 5,057,039 A | 10/1991 | Persing et al. | |
| 5,155,955 A | 10/1992 | Ball et al. | |
| 5,164,544 A | 11/1992 | Snodgrass et al. | |
| 5,226,705 A | 7/1993 | Rorke et al. | |
| 5,715,761 A | 2/1998 | Frattini | |
| 6,021,613 A | 2/2000 | Reuter et al. | |
| 9,039,077 B1 * | 5/2015 | Santamaria ............ | A47C 1/146 297/31 |
| 9,150,171 B2 * | 10/2015 | Kim ....................... | B60N 2/879 |
| 9,265,340 B2 | 2/2016 | Krusin et al. | |
| 9,585,468 B2 | 3/2017 | Udagawa et al. | |

(Continued)

FOREIGN PATENT DOCUMENTS

| | | | | |
|---|---|---|---|---|
| CA | 2257445 A1 * | 7/1999 | .......... | A47C 11/005 |
| CA | 3044995 A1 * | 12/2020 | | |

(Continued)

*Primary Examiner* — Timothy J Brindley
(74) *Attorney, Agent, or Firm* — Buchanan Ingersoll & Rooney PC

(57) ABSTRACT

Furniture can include a charging port assembly. In some embodiments, the charging port assembly can include a universal serial bus (USB) port. The assembly can be configured to facilitate the routing of a power cord for making installation occur more quickly and easily while also positioning the port in a position that is under a work surface (e.g. tablet, desktop, tabletop, etc.).

20 Claims, 7 Drawing Sheets

(56) References Cited

U.S. PATENT DOCUMENTS

| | | | |
|---|---|---|---|
| 9,609,945 B2 | 4/2017 | Krusin et al. | |
| 9,968,187 B2 | 5/2018 | Udagawa et al. | |
| 10,290,984 B2 * | 5/2019 | Salvia, III | B60N 2/90 |
| 10,720,795 B2 * | 7/2020 | Byrne | H04B 5/79 |
| 10,758,038 B2 | 9/2020 | Ruzicka et al. | |
| D901,912 S | 11/2020 | Barber et al. | |
| D907,934 S | 1/2021 | Barber et al. | |
| D908,374 S | 1/2021 | Barber et al. | |
| 11,045,003 B2 * | 6/2021 | Fietz | A47C 1/0307 |
| 11,299,078 B2 * | 4/2022 | Yamamoto | A47C 7/54 |
| 11,666,151 B1 * | 6/2023 | Gadson | A47C 7/72 |
| | | | 297/217.1 |
| 11,760,244 B2 * | 9/2023 | Yamamoto | B60N 2/0264 |
| | | | 297/217.3 |
| 2010/0290215 A1 * | 11/2010 | Metcalf | A47B 21/00 |
| | | | 362/127 |
| 2017/0127835 A1 * | 5/2017 | Jamele | B05B 1/005 |
| 2017/0258225 A1 | 9/2017 | Reeves et al. | |
| 2018/0191112 A1 * | 7/2018 | Byrne | A47C 7/72 |
| 2020/0383472 A1 | 12/2020 | Pardo et al. | |
| 2021/0007498 A1 * | 1/2021 | Dorsainvil | H02J 7/35 |
| 2021/0145184 A1 * | 5/2021 | High, Jr. | A47C 7/72 |
| 2022/0022656 A1 * | 1/2022 | Zhao | A47C 7/546 |
| 2022/0115907 A1 * | 4/2022 | Bober | H02J 50/005 |
| 2023/0209262 A1 * | 6/2023 | Nelson | A47C 7/727 |
| | | | 381/301 |

FOREIGN PATENT DOCUMENTS

| | | | | |
|---|---|---|---|---|
| CN | 104720409 A | * | 6/2015 | |
| CN | 110269420 A | * | 9/2019 | |
| CN | 110285121 A | * | 9/2019 | ........... A47B 13/003 |
| CN | 110474380 A | * | 11/2019 | |
| CN | 111374470 A | * | 7/2020 | |
| CN | 112386035 A | * | 2/2021 | ............. A47C 1/124 |
| CN | 109124129 B | * | 3/2021 | ............. A47C 4/52 |
| CN | 115067699 A | * | 9/2022 | |
| EP | 2915452 A1 | * | 9/2015 | ............. A47C 1/022 |

* cited by examiner

FURNITURE, CHARGING PORT ASSEMBLY, AND METHOD OF ASSEMBLING SAME

CROSS-REFERENCE TO RELATED APPLICATIONS

The present application claims priority to U.S. Provisional Patent Application No. 63/183,863, filed on May 4, 2021.

FIELD

The present innovation relates to furniture and the utilization and assembly of charging ports utilizable in furniture to facilitate powering and/or charging of electronic devices (e.g. smart phones, tablets, laptop computers, smart speakers, electrical appliances, etc.).

BACKGROUND

Furniture can include chairs, sofas, couches, and other types of seating and other furniture. Furniture can include power outlets. Such power outlets are typically located on a tabletop or desktop and are wired so a device can be plugged into the outlet of the furniture at the tabletop or desktop. Examples of furniture having power outlets and power cord routing that can be utilized in furniture can be appreciated from U.S. Pat. Nos. 4,325,597, 4,619,486, 4,950,839, 5,048, 698, 5,057,039, 5,155,955, 5,164,544, 5,226,705, 5,715,761, 6,021,613, 9,265,340, 9,585,468, 9,609,945, 9,968,187, 10,758,038, U.S. Design Pat. Nos. D901,912, D907,934, and D908,374, and U.S. Pat. App. Pub. Nos. 2017/0258225 and 2020/0383472.

SUMMARY

I have determined that it can be desirable to provide a charging port for an electrical appliance (e.g. smart phone, tablet, laptop computer, etc.) so that the charging port is located below a tablet, tabletop, desktop, or other work surface that may be positioned above a seat. Such a positioning of the charging port can permit the cord and plug for the electrical device to extend below the work surface so that more of the work surface or an entirety of the work surface can be utilized by a user to position or hold the user's electrical device(s) and/or other objects (e.g. a user elbow, a book, etc.). For instance, I have determined that such a feature can be helpful to a user when the user is trying to utilize a smaller work surface to support a user's laptop or tablet while also charging the battery of the device. Examples of a charging port that can be utilized in a charging port assembly that can be incorporated into furniture can include at least one universal serial bus (USB) port, at least one power outlet, and/or at least one combination of an electrical power outlet and USB port.

I have determined that the positioning of a charging port assembly can be designed and configured for utilization in furniture to provide flexibility of installation and also permit installation of the charging port and work surface to be performed with increased ease to making installation less time consuming and costly. In some embodiments, the charging port assembly can be utilized in a module furniture design so that such assemblies can be positioned at various locations adjacent to different seats of furniture, such as sofas, couches, or bench seating that may be positioned in an airport, train station, retail space, office space, or other location. Furniture and a charging port assembly for furniture as well as methods of making and using the same are provided that can address these issues and provide one or more of these features or all of these features depending on the particular design objectives for the furniture or charging port assembly.

In some embodiments, an article of furniture can include a base, at least one seat supported by the base, and at least one charging port assembly attached to the base. The charging port assembly can include an arm, a work surface attached to an upper portion of the arm, and a charging port attached to the arm below the work surface.

The work surface can be moveably attached to the upper portion of the arm. For instance, the work surface can be rotatably attached to the upper portion of the arm and/or can be slideably attached to the arm. The work surface can be positioned above the at least one seat. In some embodiments in which the article of furniture includes multiple seats, the work surface can be positioned above and between two of the seats, for example.

The article of furniture can also include other elements or features. For instance, the article of furniture can include a first back supported by the base to support a back of a user sitting on a first seat of the at least one seat. For instance, the article of furniture can be structured as a sofa or couch and the at least one seat can include a first seat and a second seat. The arm can be attached to the base between the first seat and the second seat. In other embodiments, the article of furniture can be another type of bench seating apparatus, or be structured as lounge seating that includes multiple seats and/or end tables or intermediate table type structures between seats.

The arm can be structured in different ways. In some embodiments, the arm can include a charging port retention portion positioned between a lower portion of the arm and an upper end of the upper portion of the arm. The charging port retention portion can have an opening to receive and retain the charging port therein. The opening of the charging port retention portion can be in communication with a channel of the arm that extends to a lower end of the lower portion of the arm. The channel can be sized and configured to retain a portion of a power cord extending from the charging port. The power cord can be integrated into the charging port or can be coupled to the charging port via a power cord interface (e.g. a jack or other outlet) defined in a side of the charging port, such as a rear side of the charging port that is opposite the outlet(s) of the charging port that are sized to receive power plugs, USB plugs, or other plugs for charging of an electronic device or powering of the device.

The arm can be structured to define a passageway between the channel and the opening of the charging port retention portion that is sized and configured to permit the cord to extend from the channel to the opening of the charging port retention port via the intermediately positioned passageway. The passageway can also extend from the channel to an upper opening of an upper portion of the arm.

The power cord of the charging port can include a plug at a terminal end of the power cord. The plug can be positionable within an outlet of a floor or wall adjacent the article of furniture or an outlet attached to the base. The plug can be a three ponged plug, a two pronged plug, or other type of power cord plug for connection to another power cord or an electrical outlet. In some embodiments that utilize a two pronged plug, an adapter can be utilized to convert alternating current to direct current.

The arm can also include other features. For example, the arm can include a cover member that is attachable to the arm to cover the channel and enclose the portion of the power cord within the channel of the arm. The cover member can be releaseably connectable to the arm to permit the cover member to be removed for access or manipulation of the power cord.

The arm can have different structures and geometries. For instance, the arm can be cantilevered such that a lower portion of the arm extends horizontally and vertically from the base of the article of furniture and the upper portion of the arm extends vertically above the lower portion of the arm. Such a structure can include a curved or linearly extending portion between an upper portion and a lower portion of the arm.

A charging port assembly for furniture is also provided. Embodiments of the charging port assembly can include an arm. An upper portion of the arm can be attachable to a work surface. A charging port retention portion of the arm can be below an upper end of the upper portion. The charging port retention portion can have an opening sized to retain a charging port therein. The arm can have a channel defined therein. The channel of the arm can be in communication with the opening of the charging port retention portion so that a power cord of the charging port is passable through the channel. A cover member can be attachable to the arm to cover the channel.

In some embodiments, the above mentioned passageway can be defined in the arm to extend between the channel and the opening of the charging port retention portion so that the channel is in communication with the opening of the charging port retention portion, for example. In other embodiments, the channel can be in communication with the opening of the charging port retention portion without any intermediate apertures.

As discussed above, the arm can have different shapes or geometries. In some embodiments, the arm can be a cantilevered arm. A lower portion of the arm can define the channel and the lower portion of the arm can extend vertically and horizontally to the upper portion of the arm. The upper portion of the arm can extending vertically.

A rotational connection mechanism can be attached to an upper end of the upper portion of the arm to rotatably attach the work surface to the arm. Other embodiments can utilize different types of moveable connection mechanisms to moveably connect the work surface to the arm.

In some embodiments, the rotational connection mechanism can include an axle member having a lower portion positionable within an opening of the upper end of the upper portion of the arm and an upper portion that is positioned above the upper end of the upper portion of the arm. The work surface can be rotatable about the upper portion of the axle member. The rotational connection mechanism can also include an upper flange positioned between the work surface and the axle member. The upper flange can be retainable within a flange retention opening defined within a bottom of the work surface. There can also be a lower flange positioned below the upper portion of the axle member so that the upper portion of the axle member is between the upper flange and the lower flange. The lower flange can be attachable to the upper flange and/or the work surface such that the work surface is rotatable about the axle member. The work surface can have an opening defined in a bottom of the work surface. At least one of the lower flange, the upper flange and the upper portion of the axle member can be retained within the opening of the bottom of the work surface such that the work surface is rotatable about the upper portion of the axle member.

A method of installing a charging port assembly onto furniture is also provided. Embodiments of the method can include providing an arm. An upper portion of the arm can be attachable to a work surface. A charging port retention portion of the arm can be below an upper end of the upper portion. The charging port retention portion can have an opening sized to retain a charging port therein. The arm can have a channel defined therein. The channel of the arm can be communication with the opening of the charging port retention portion so that a power cord of the charging port is passable through the channel. In some embodiments, a passageway can be positioned between the channel and the opening of the charging port retention portion such that these apertures are all in communication with each other for routing of the power cord. The method can also include routing the power cord through the opening of the charging port retention port and through the channel, inserting the charging port into the opening of the charging port retention portion to attach the charging port to the charging port retention portion of the arm, attaching a cover member to the arm to cover a portion of the power cord within the channel of the arm, and attaching a lower portion of the arm to a base of furniture so that the arm is positioned adjacent to a seat supported by the base.

Embodiments of the method can also include other steps or features. For instance, embodiments can include coupling the plug of the power cord within an outlet adjacent to the article of furniture or attached to the base of the article of furniture. As another example, embodiments can include attaching the work surface to the upper end of the upper portion of the arm so that the work surface is above the charging port. The work surface can be affixed to the upper portion of the arm and/or moveably connected to the upper portion of the arm (e.g. via a rotational connection mechanism or other type of moveable connection mechanism).

Other details, objects, and advantages of the invention will become apparent as the following description of certain exemplary embodiments thereof and certain exemplary methods of practicing the same proceeds.

BRIEF DESCRIPTION OF THE DRAWINGS

Exemplary embodiments of furniture and charging port assemblies for furniture are shown in the accompanying drawings and certain exemplary methods of making and practicing the same are also illustrated therein. It should be appreciated that like reference numbers used in the drawings may identify like components.

DETAILED DESCRIPTION OF EXEMPLARY EMBODIMENTS

Referring to FIGS. 1-9, an article of furniture 1 can include a base 2 that supports at least one seat 4*a* and at least one back 4*b*. The seat 4*a* can be configured to support a lower part of the user while the back 4*b* can extend above the seat 4*a* to support a back and/or head of the user while the user sits in the seat 4*a*. The seat 4*a* and back 4*b* can each include at least one cushion element and may also be upholstered, comprised of a mesh body, or have another type of structure to facilitate the user's ability to sit in the seat 4*a* and rest his or her back against the back 4*b* while sitting in the seat 4*a*. In some embodiments, the back 4*b* and seat 4*a* can be covered via fabric or leather or other covering positioned over at least one cushion element.

The base 2 can include a plurality of legs 2*a* and one or more support elements 2*b* that extend above the legs 2*a* to support the seat 4*a* and/or back 4*b*. The seat 4*a* and/or back 4*b* can be attached to each support element 2*b* to be positionable at a pre-selected height above a floor.

In some embodiments, the base 2 can include multiple space apart support elements 2*b*. In other embodiments, the base 2 may only include a single support element 2*b*.

Figure 6:
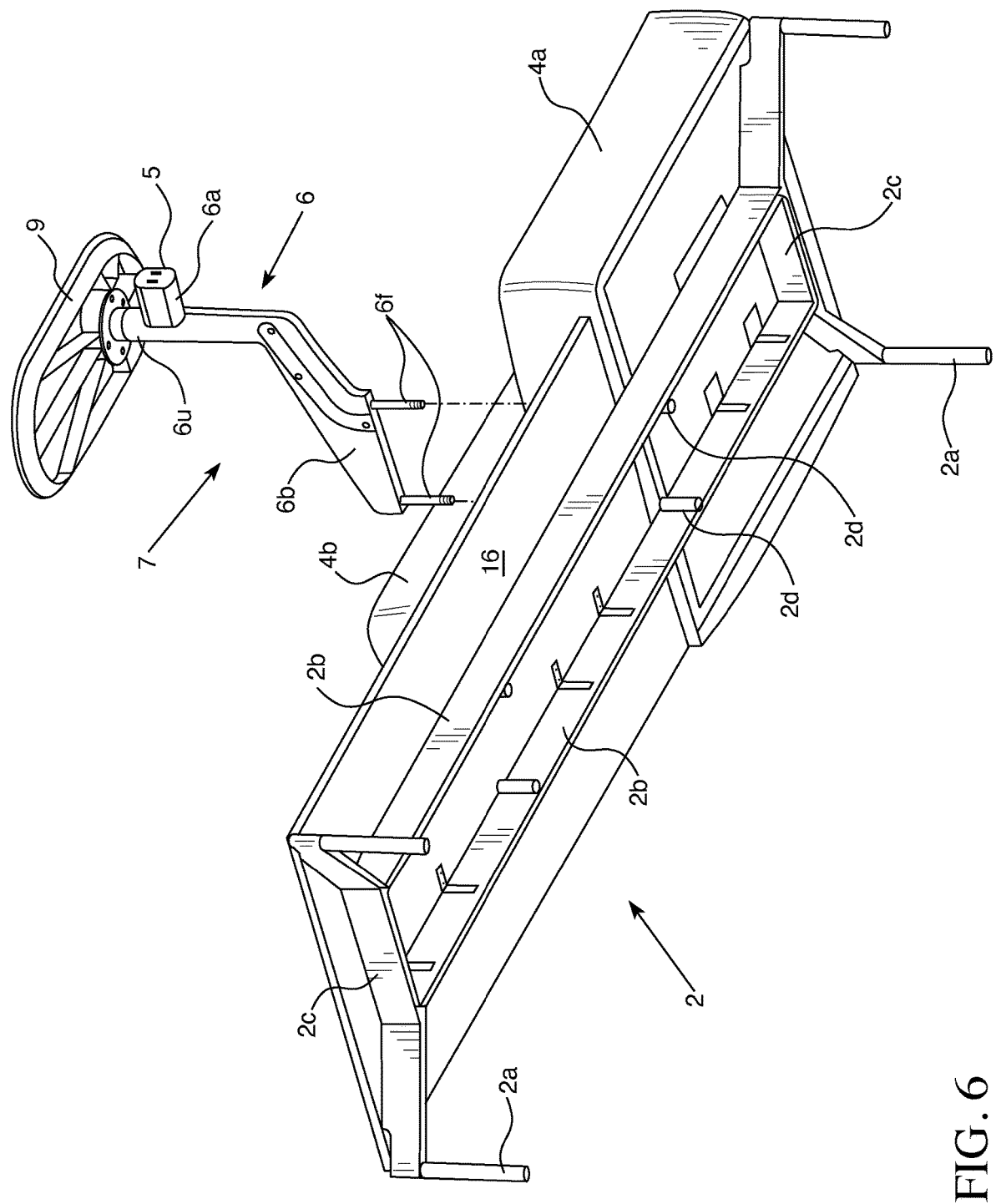
FIG. 6 is an exploded view of the first exemplary embodiment of furniture 1.

As may best be appreciated from FIG. 6, end supports 2*c* can be attached between a set of legs 2*a* and ends of support elements 2*b* to facilitate attachment of the legs to the support elements 2*b*. For instance, a first end support 2*c* can be attached to first ends of first and second support elements 2*b* and a first set of legs 2*a*. A second end support 2*c* can be attached to second ends of first and second support elements 2*b* and a second set of legs 2*a*. The first and second support elements 2*b* can be spaced apart from each other to define a gap between the support elements 2*b*. In some embodiments, cross members (not shown) can be positioned to extend between the spaced apart support elements 2*b* to provide additional supportive structure to the base 2 for supporting the seat 4*a* and back 4*b*.

The support elements 2*b* can be relatively rigid members. Examples of support elements 2*b* can include members such as, for example, arms, beams, rods, or rails. The support elements 2*b* can be comprised of wood, metal, a composite material and/or a polymeric material.

The end supports 2*c* can be relatively rigid members as well. Examples of end supports 2*c* can include members such as, for example, arms, beams, rods, or rails. The end supports 2*c* can be comprised of wood, metal, a composite material and/or a polymeric material.

The legs 2*a* can be a member that is configured to support the base 2 on a floor. The legs 2*a* can include a terminal end that has a castor, glide, or foot to contact the floor. The legs 2*a* can be comprised of metal, wood, a composite, or a polymeric material.

The support elements 2*b* can also include receptacles 2*d* for attachment of one or more charging port assemblies 7.

The receptacles 2*d* can be defined in the body of each support element 2*b* or can be attached to the body of the support element (e.g. fastened thereto, welded thereto, etc.). Each receptacle 2*d* can include a channel or other type of opening to receive a portion of the charging port assembly 7 or a fastener extending from the charging port assembly 7 (e.g. bolt, screw, etc.) for attachment of the charging port assembly 7 to the support element to which that receptacle 2*d* is attached or otherwise integrated therein.

The receptacles 2*d* can be positioned to facilitate positioning of the charging port assemblies 7 at different locations to position a work surface 9 and at least one charging port 5 above at least one seat. The charging port assembly 7 can be positionable adjacent to a seat 4*a*, between multiple seats 4*a*, between a seat 4*a* and an end table 16, or between a seat 4*a* and another element of the furniture (e.g. divider, privacy screen, display, tabletop, desktop, lighting, etc.).

Each charging port assembly 7 can include an arm 6 that supports a charging port 5 and a work surface 9 above the charging port 5. The arm 6 can be a hollow member that is a unitary body or can be a body defined by multiple interconnected portions that are attached together. The hollow portion of the arm 6 can include a channel 6*cc* that is in communication with a passageway 6*pw*. The passageway 6*pw* can be in communication with an opening 6*ao* of an intermediate charging port retention portion 6*a* and an upper opening 6*uo* of an upper portion 6*u* of the arm 6

The arm 6 can be sized and configured to extend from adjacent one or more support elements 2*b* to which a lower end of the arm 6 is attachable to an upper position located above one or more seats 4*a* of the furniture. Each charging port assembly can be attached to the base 2 so that an arm 6 of the charging port assembly 7 is positionable between different seats 4*a*, at an end of the furniture adjacent a seat, or between a seat and another furniture element (e.g. desktop 16, a light fixture, etc.).

The charging port 5 of the charging port assembly 7 can be a USB port, a power outlet, a combination of at least one power outlet and at least one USB port, or other type of charging port. In some embodiments, the charging port 5 can be a single USB port, a single power outlet, multiple USB ports, multiple power outlets, or combinations thereof.

The work surface 9 can be a tablet, desktop or tabletop structure. For instance, work surface 9 include a work surface member (e.g. a plate or a pad structure) that defines a tablet sized and configured to support a laptop, electronic tablet, book or other relatively small object or set of objects. In some embodiments, the work surface 9 can be structured as an oversized armrest support that can function as an armrest support as well as a support surface for at least one small electrical appliance (e.g. tablet, smartphone, etc.) and/or book or other object. The work surface 9 can be comprised of a polymeric material, wood, metal, or a composite material. In some embodiments, the work surface 9 can include a laminated surface that covers a more rigid support body (e.g. a plate or a pad). In some other embodiments, the work surface 9 can be a fabric or leather covered support body (e.g. a plate or a pad, etc.).

Figure 2:
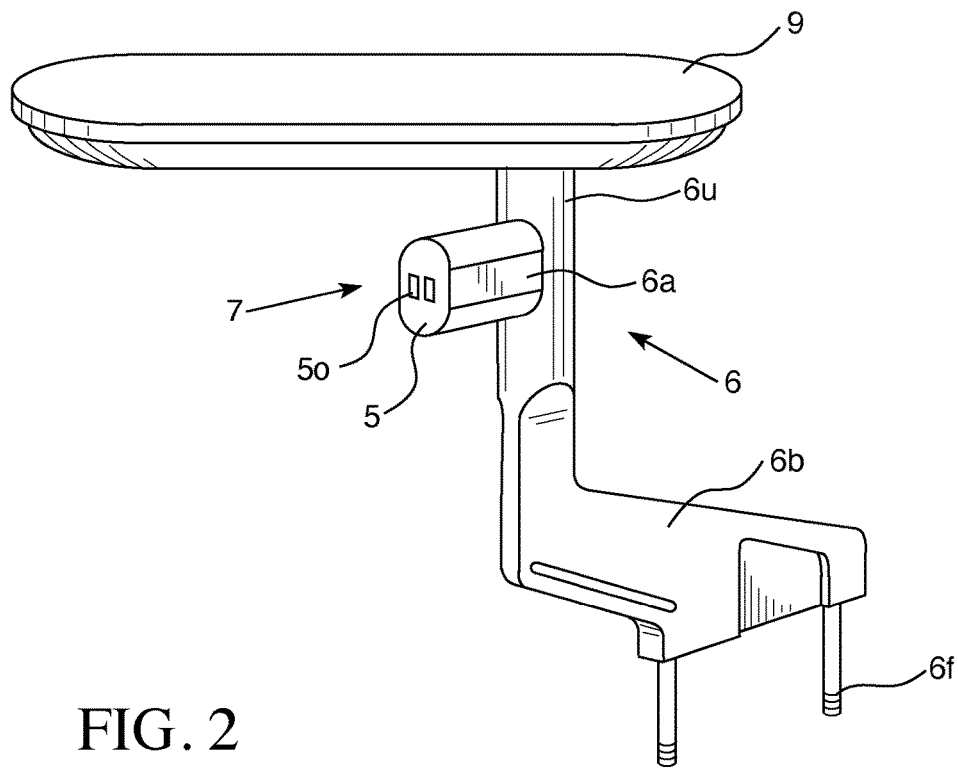
FIG. 2 is a perspective view of the first exemplary embodiment of the charging port assembly 7, which illustrates a first side of the assembly.
Figure 3:
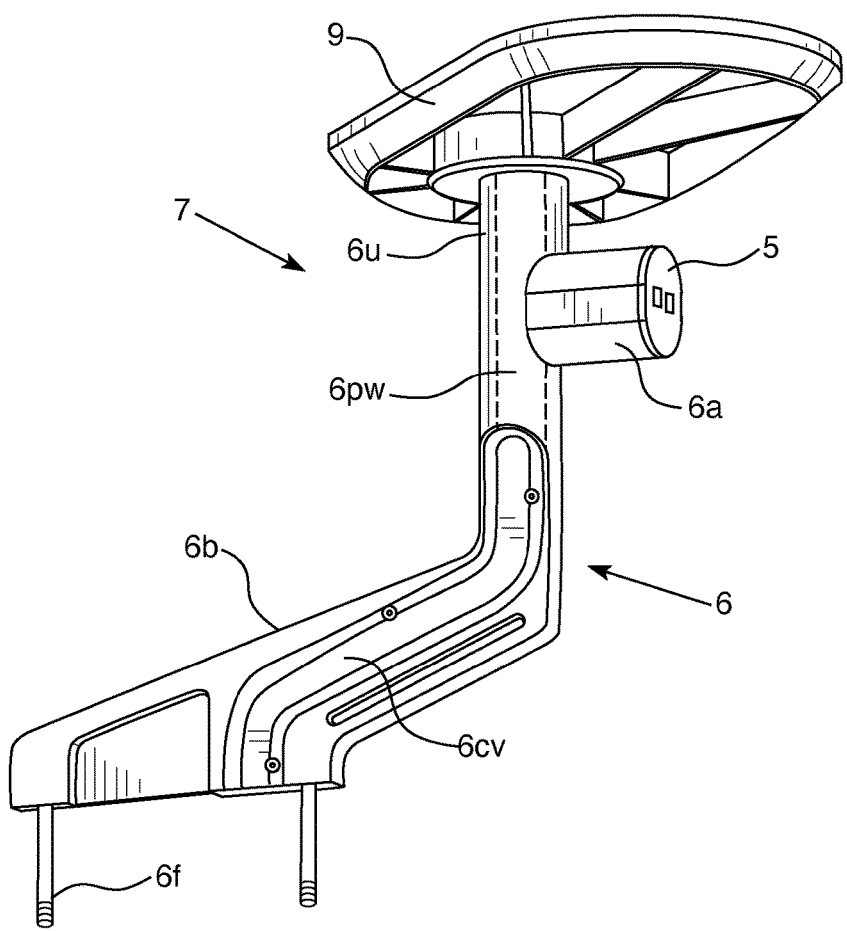
FIG. 3 is another perspective view of the first exemplary embodiment of the charging port assembly 7, which illustrates a second side of the assembly.

As may best be appreciated from FIGS. 2-4, the arm 6 of the charging port assembly 7 can include a lower end of a lower portion 6*b* that is below an upper portion 6*u* that extends vertically above the lower portion 6*b*. The lower end of the lower portion can have holes to receive projection members 6*f* that can extend from the lower end of the lower portion 6*b*. The projection members 6*f* can be fasteners (e.g. bolts, screws) or can be other types of projecting members (e.g. protrusions, etc.) that can extend below the lower end of the bottom portion 6b of the arm 6 for being positioned within one or more receptacles 2d of the support elements 2b.

Some embodiments of the arm 6 can include a single projection member 6f for being positioned within an interlocked within a receptacle of a support element 2b. Other embodiments of the arm can 6 include multiple spaced apart projection members 6f that can each be positioned within and interlocked within respective spaced apart receptacles 2d. For example, a first projection member 6f can be positioned to extend from the lower end of the lower portion 6b of the arm 6 to a first receptacle 2d of a first support element 2b and a second projection member 6f can be positioned to extend from the lower end of the lower portion 6b of the arm 6 to a second receptacle 2d of a second support element 2b that is spaced apart from the first support element 2b.

In some embodiments, each projection member 6f can have opposite threaded ends to mate with threads within holes of the arm 6 defined in the lower portion 6b of the arm and threads defined in the receptacles 2d. Rotation of each projection member 6f in a first rotational direction can simultaneously tighten the attachment between the lower portion 6b of the arm 6 to the receptacle 2d of the support element 2b for attachment of the arm 6 to each support element 2b. It should be appreciated that the first rotational direction can be clockwise and the second rotational direction can be counter-clockwise or vice versa (e.g. the first rotational direction can be counterclockwise and the second rotational direction can be clockwise). Rotation of each projection member 6f in a second rotational direction that is opposite the first rotational direction can simultaneously loosen the attachment between the arm 6 and the receptacle 2d.

In some embodiments, a user can use mechanical tools and/or hands of the user can be used rotate all the projection members 6f at the same time to perform this attachment. In other embodiments, a user can rotate each projection member 5f separately to perform the attachment.

The upper portion 6u of the arm 6 can be attached to the work surface 9 to support the work surface 9 at a position that is above the seat 4a and below the charging port 5. As may best be appreciated from FIGS. 2-6, the arm 6 can also include an intermediate charging port retention portion 6a that has an opening 6ao that is sized and shaped to receive the body 5a of the charging port 5. The opening 6a of the charging port retention portion 6a of the arm can be in communication with a channel 6cc defined within the arm that extends from the opening 6ao of the charging point retention portion 6a to the lower end of the lower portion 6b. The channel 6cc defined in the arm 6 can be sized and configured to route a cord 5c having a plug 5p at its terminal distal end through the channel 6cc and retain a portion of the cord 5c within the channel 6cc of the arm 6. At least a portion of the channel 6cc can be enclosable within the arm 6 via a cover member 6cv that can be attached to the lower portion 6b of the arm to removable cover the channel 6cc. The cover member 6cv can be a sheet, a plate member or other type of cover element that is positionable over the channel 6cc to cover the channel 6cc and enclose a portion of the cord 5c extending from the body 5a of the charging port 5 within the channel 6cc.

The arm 6 can also define a passageway 6pw therein. The passageway 6pw can extend from an opening 6uo of the upper portion 6u of the arm 6 to the channel 6cc. The passageway 6pw can also include a portion that extends from the channel 6cc to the opening 6ao of the charging port retention portion 6a. The passageway 6pw can be positioned so that the opening 6ao of the charging port retention portion 6a is in communication with the channel 6cc. In other embodiments, the channel 6cc can extend to the opening 6ao of the charging port retention portion such that there is no intermediate aperture between the channel 6cc and opening 6ao of the charging port retention portion 6a.

The cord 5c and plug 5p can be components of the power cord of the charging port 5. The power cord can be configured to transmit electricity from an outlet positioned in a floor or wall of a room or space of a building in which furniture 1 is to be positioned. The plug 5p can be sized to be plugged into such an outlet to facilitate formation of an electrically conductive connection between the charging port 5 and the outlet of the floor or wall of the building or an outlet attached to a support element 5b or other part of the base 2 of the furniture. The plug 5p can also be coupled to a plug receptacle of an extension cord that may be plugged into such an outlet.

In some embodiments, it is contemplated that the channel 6cc can be sized to retain a power cord as well as at least one data cord therein that may extend from the charging port 5. In such embodiments, the data cord may have a terminal plug or terminal adapter for connection to a floor or wall mounted data communication outlet (e.g. Ethernet outlet or intranet network outlet, etc.) for a wired connection to a communication network. The charging port 5 in such embodiments can include an outlet, jack, port, or other type of connection interface for connecting an electronic device (e.g. laptop computer, tablet, router, access point, etc.) to the network via this data cord as well. This type of interface can be included with at least one USB port and electrical outlet of the charging port 5.

The arm 6 can be a single body that extends from its lower portion 6b to its upper portion 6u. The arm can have a cantilevered configuration such that a first lower intermediate portion of the arm extends horizontally and vertically from the lower end of the lower portion 6b and a second intermediate portion extends vertically to the terminal end of the upper portion 6u of the arm 6. The first lower intermediate portion of the arm can extend linearly or can be curved as it extends horizontally and vertically from the lower end of the lower portion 6b to the second intermediate portion. The vertical extension of the second intermediate portion that extends to the upper end of the upper portion 6u can extend linearly in only a vertical direction in some embodiments. This second intermediate portion can be attached to the charging port retention portion 6a of the arm as well. In other embodiments, the charging port retention portion 6a can be attached to the first intermediate portion that extends horizontally and vertically from the lower end of the lower portion 6b.

One or more bolts, screws, or other attachment mechanisms (e.g. mateable connectors, etc.) can be utilized to attach the cover 6cv to the lower portion 6b of the arm so that the cover 6cv can be removed and reattached to the arm to expose the channel 6cc so a use can access the cord 5c and/or plug 5p and manipulate the cord 5c and/or plug 5p to help route the cord through the arm 6 during installation.

Figure 5:
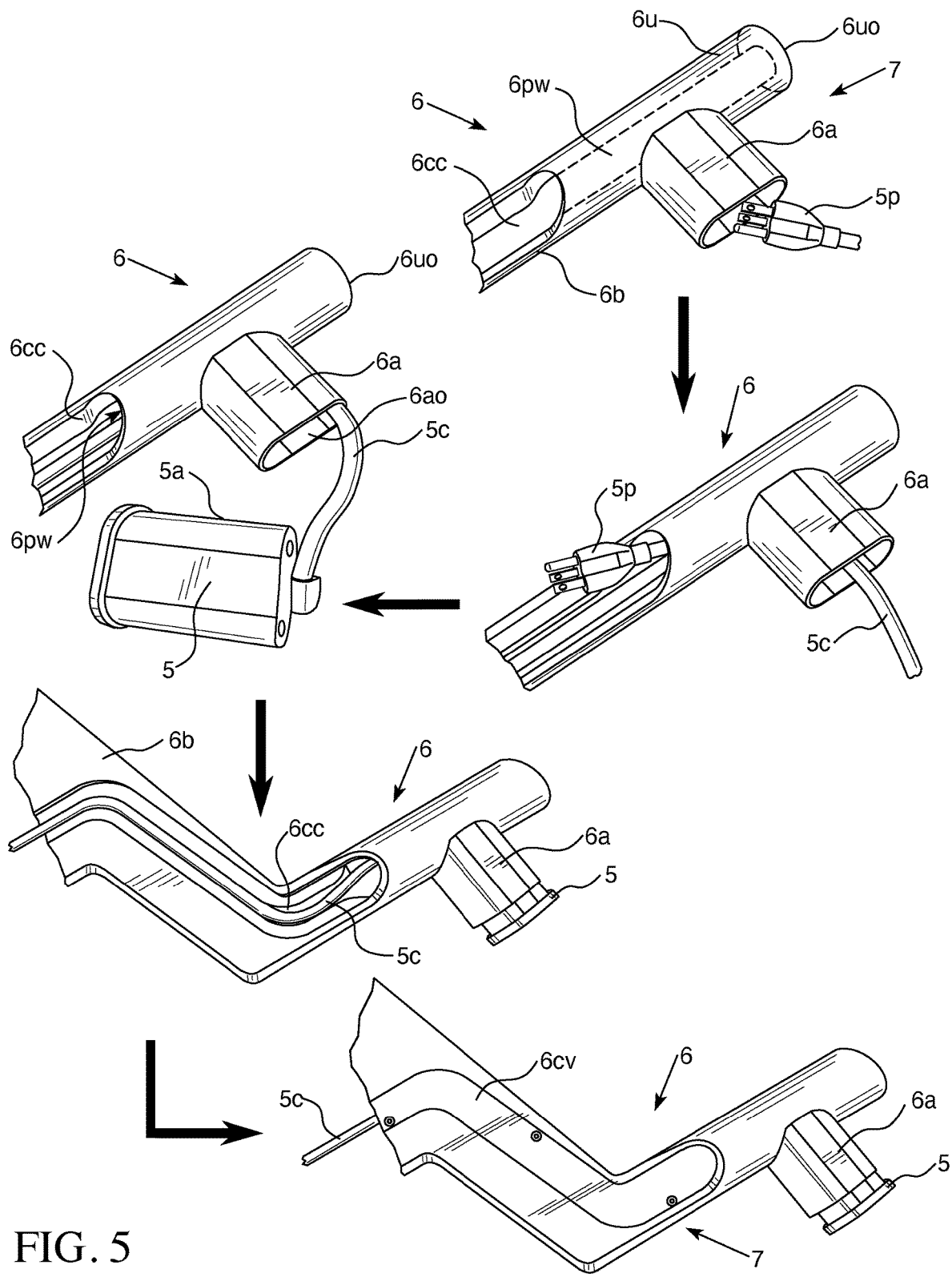
FIG. 5 is a schematic flow chart illustrating an exemplary method of routing a power cord 5c having a plug 5p through the first exemplary embodiment of the charging port assembly 7 for integrating the charging port 5 into the assembly.

As may best be appreciated from FIG. 5, the body 5a of the charging port 5 can be attached to the charging port retention portion 6a within the opening 6ao of this portion after the plug 5p and cord 5c of the power cord of the charging port 5 is passed through the opening 6ao and through channel 6cc of the arm 6. For example, the plug 5p can first be passed through the opening 6ao of the charging port retention portion 6a and then routed through the opening 6*ao* and then through the channel 6*cc* in communication with this opening 6*ao*. The cord 5*c* can be moved through the opening 6*ao* and channel 6*cc* of the arm as well as the plug 5*p* is manipulated by a user to route the plug through a passageway 6*pw* at least partially defined by the arm 6 between the opening 6*ao* and channel 6*cc* of the arm 6. The cord 5*c* can be positioned in the channel 6*cc* so that the plug 5*p* and a portion of the cord 5*c* extends out of the lower end of the lower portion 6*b* of the arm so that the plug 5*p* can be coupled to an outlet mounted to a floor or wall adjacent the article of furniture 1. The cover member 6*cv* can then be attached to the arm 6 to fully enclose the cord 5*c* within the channel 6*cc* of the arm and limit access to the cord 5*c*. The cover member 6*cv* can be releasably attached to the arm 6 so that the cover member 6*cv* can be removed from the arm and permit a user to adjust the cord within the channel 6*cc* or remove the charging port 5 from the arm 6 to facilitate replacement of a broken or damaged charging port 5 or power cord of the charging port 5. The covering of the channel 6*cc* can also help protect the cord from undesired entanglements or manipulations from different users (e.g. small children) who may be exposed to the charging port assembly 7.

In some embodiments, the plug 5*p* of the cord 5*c* can include a two-prong cord that has a large area, width, or diameter that may make the cord plug hard or impossible to pass through the channel 6*cc*. For instance, the plug 5*p* can include an adapter to convert alternating current to direct current that results in the plug having a larger area that may prevent the plug from being passed through the passageway 6*pw* or through the channel 6*cc*. For such embodiments (or other embodiments), the cord 5*c* can be routed from the uncovered channel 6*cc* (having the cover member 6*cv* removed for cord routing). The cord 5*c* can be positioned in the channel 6*cc* so that the plug 5*p* and a portion of the cord 5*c* extends out of the lower end of the lower portion 6*b* of the arm so that the plug 5*p* can be coupled to an outlet mounted to a floor or wall adjacent the article of furniture 1. The cord 5*c* can be moved through the channel 6*cc* as well so that the cord 5*c* extends from the channel 6*cc* and through the passageway 6*pw* between the channel 6*cc* and the opening 6*ao* so that the cord 5*c* is passed to the opening 6*ao*. This motion of the cord can be caused by a user manipulating the cord 5*c* or an end of the cord opposite the plug 5*p* to route the cord through the passageway and to the opening 6*a*. The end of the cord 5*c* opposite the plug 5*p* can then be coupled to the charging port 5 via a cord interface connection 5*ip* of the charging port 5. This interface connection 5*ip* can be a plug receptacle in the rear 5*r* of the charging port 5 opposite the USB and/or power outlets 5*o* positioned at or near the front of the charging port 5. After the cord 5*c* is routed for connection to the charging port 5, the cover member 6*cv* can be attached to the arm 6 to fully enclose the cord 5*c* within the channel 6*cc* of the arm and limit access to the cord 5*c* after the cord is connected to the port 5 via the electrical connection interface 5*ip* and charging port connector plug of the cord 5 on the end of the cord opposite the plug 5*p*. The plug 5*p* can then be coupled to a suitable outlet to provide electricity to the charging port 5.

In some embodiments, the plug 5*p* of the cord can be positioned for forming a daisy chain of electrical wiring of other charging port assemblies 7 attached to the base 2. This daisy chain arrangement may be utilized in some bench seating arrangement embodiments of the furniture, for example. In such a configuration, the cord 5*c* may not have a plug 5*p* at its terminal end. Instead, the cord 5*c* can be electrically connected to another main power cord that may be attached to the base 2 of the furniture and extend for connection with other cords 5*c* of other charging port assemblies 7 that are connected to the base 2. As another example, the plug 5*p* can be present and can be coupled into a receptacle of a main power cord having plug receptacles at different locations for attachment to plugs of different cords 5*c* of different charging port assemblies 7. This main power cord can be coupled to the base 2 in some embodiments (e.g. attached to a support element 5*b*, etc.).

The body 5*a* of the charging port 5 can be positioned within the opening 6*ao* of the charging port retention portion 6*a* of the arm before the cord 5*c* is in a final position within the channel 6*cc* and the cover member 6*cv* is attached to the arm 6. The body 5*a* can be attached within the charging port retention portion 6*a* via an interference fit it can have within the opening 6*ao* and/or can be adhered, bonded, fastened, or otherwise attached to the arm after the body 5*a* is within the opening 6*ao*. An outer face of the body 5*a* having one or more openings for coupling to a power cord of an electrical device can be positioned to face away from the arm 6 to facilitate a user inserting a plug (e.g. a USB plug or power plug) within the one or more openings of the outer face of the body 5*a* of the charging port 5.

Figure 1:
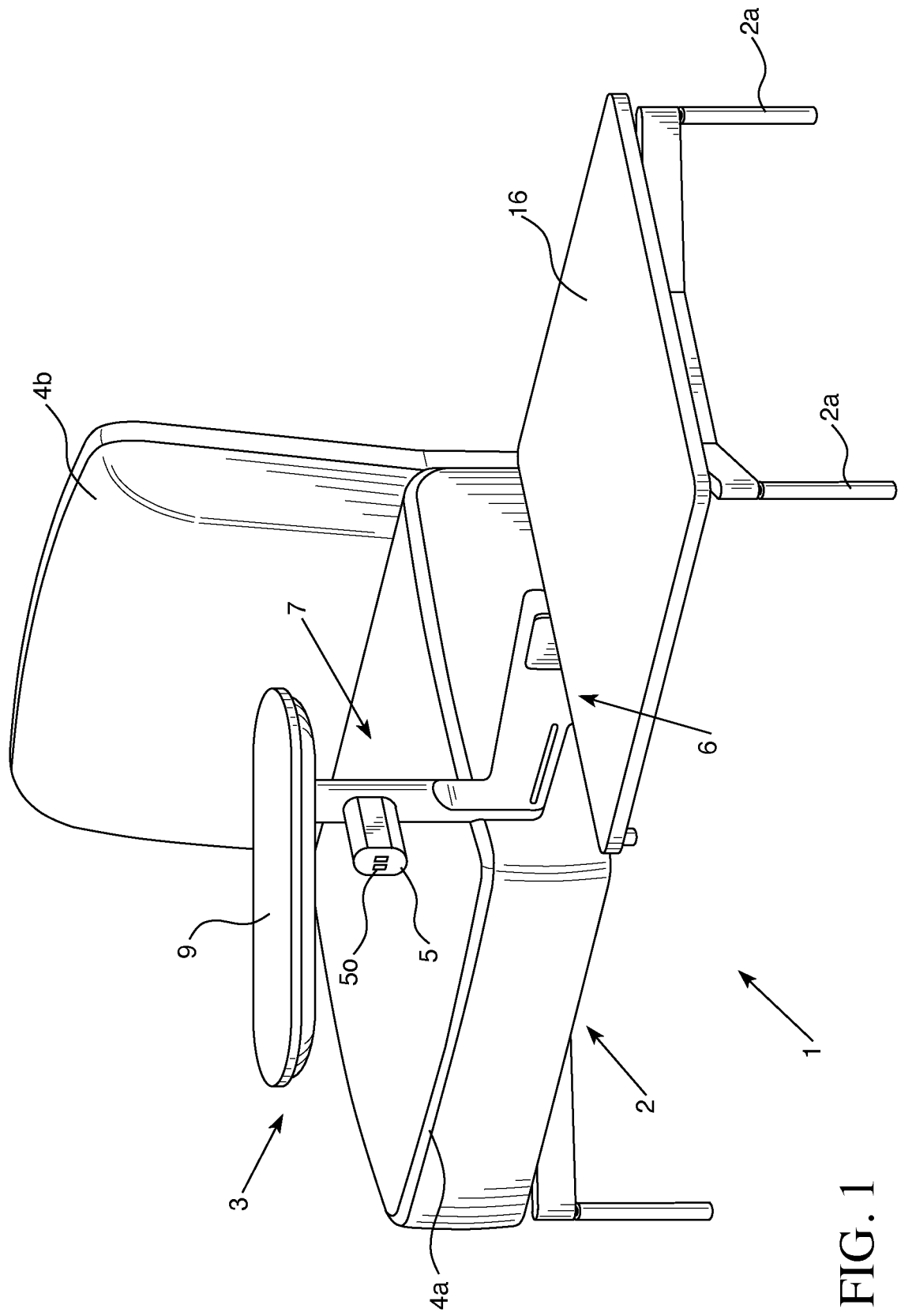
FIG. 1 is a perspective view of a first exemplary embodiment of an article furniture 1 that utilizes a first exemplary embodiment of a charging port assembly 7 positioned adjacent to a seat 4a of the furniture.
Figure 4:
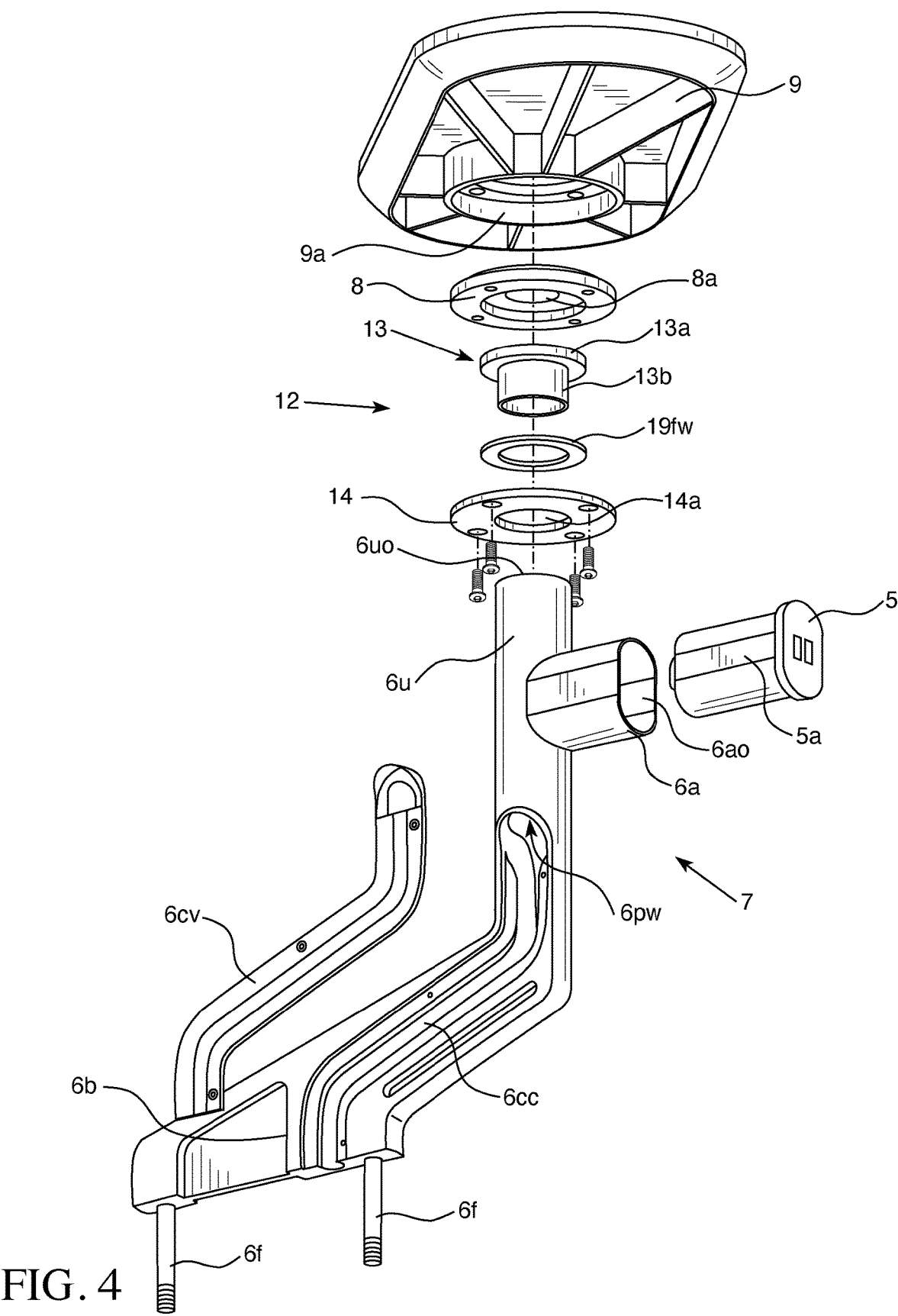
FIG. 4 is an exploded view of the exemplary embodiment of the charging port assembly 7.
Figure 7:
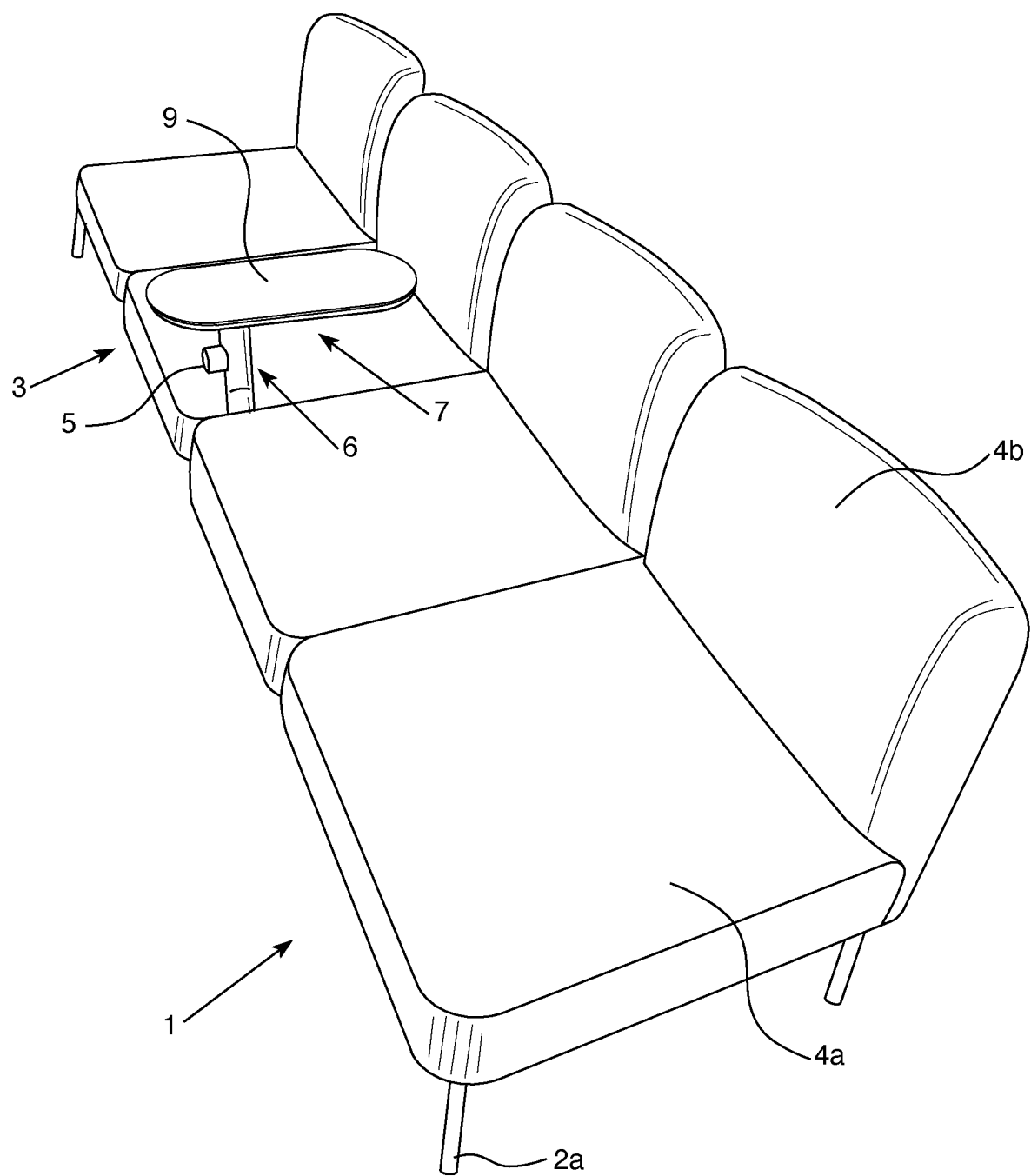
FIG. 7 is a perspective view of a second exemplary embodiment of furniture 1 that utilizes the exemplary embodiment of a charging port assembly 7 positioned between seats 4*a* of the article of furniture 1 so that the charging port 5 and work surface 9 are positioned adjacent to multiple seats 4*a* of the article of furniture 1.
Figure 8:
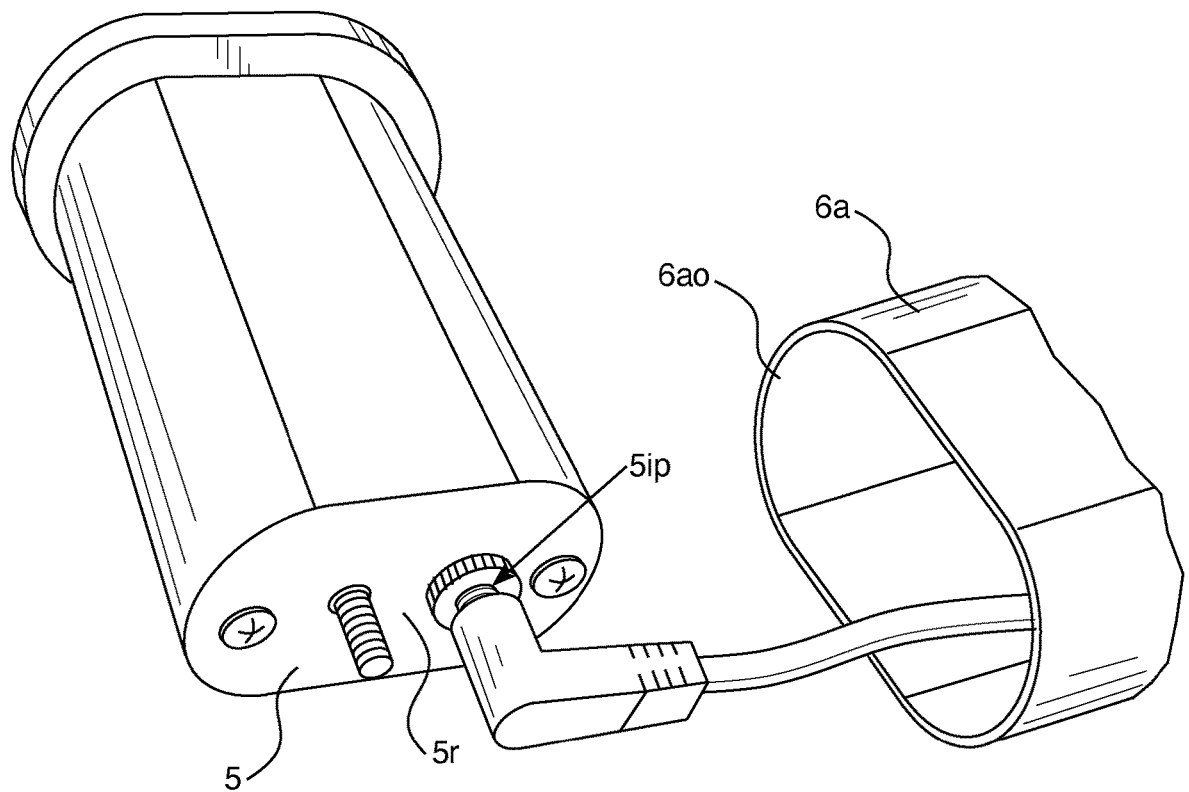
FIG. 8 is a rear perspective view of an exemplary charging port 5 of the exemplary embodiment of the charging port assembly 7.
Figure 9:
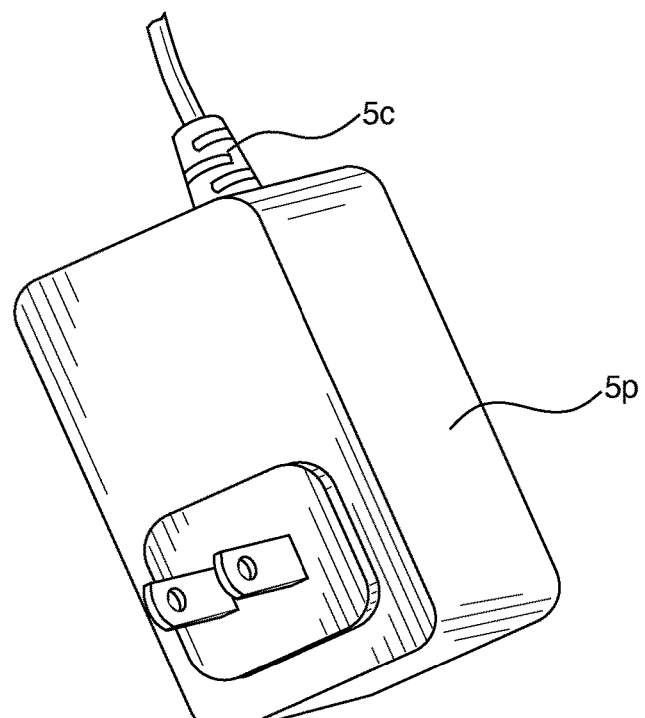
FIG. 9 is a perspective view of an exemplary plug 5*p* of a cord 5*c* that can be utilized in embodiments of the charging port assembly 7. The exemplary plug of FIG. 9 includes an adapter that can be utilized to convert alternating current to direct current.

As may best be appreciated from FIGS. 1, 4, and 7, the work surface 9 can be moveably attached to the upper portion 6*u* of the arm 6. For example, the work surface 9 can be rotatably attached to the upper portion 6*u* of the arm so that the work surface 9 can be rotated into different positions about a vertically extending axis defined by a component of the charging port assembly 7 attached between the arm 6 and the work surface 9. Such a rotatable attachment can permit the work surface 9 to be rotated relative to the arm 6 along a pre-selected path or rotation. Such a path of rotation may be 360 degrees of rotation in clockwise or counterclockwise directions. The work surface 9 can be attached to be rotated so it is rotatable in clockwise and counterclockwise directions for multiple revolutions. In other embodiments, the rotatable path may be less than a complete revolution (e.g. a rotation of 270° or 180°).

The work surface 9 can be attached to the upper portion 6*u* of the arm 6 via a rotatable connection mechanism 12. The rotatable connection mechanism 12 can include an upper flange 8, a lower flange 14, and an axle member 13. The axle member can include an upper portion 13*a* and a lower portion 13*b*. The upper portion 13*a* of the axle member 13 can have a width or diameter that is larger than the width or diameter of the lower portion 13*b*. The lower portion 13*b* can be sized to be retained within an opening of the upper portion 6*u* of the arm 6. The opening of the upper portion 6*u* of the arm 6 can be in communication with the channel 6*cc*, passageway 6*pw* and the opening 6*ao* of the charging port retention portion 6*a* in some embodiments. The upper portion 13*a* of the axle member 13 can be sized to be larger than the opening in the upper portion 6*u* of the arm 6 and be positioned to be above the arm 6 and/or in contact with the upper portion 6*u* of the arm 6 at its upper end. The lower flange 14 can be an annular body having an inner opening 14*a*. The lower portion 13*b* of the axle member can be size to pass through the opening 14*a* of the lower flange 14. The upper portion 13*a* of the axle member 13 can be larger than the inner opening 14*a* so that it is in contact with the body of the flange 14 at the top of the body of the lower flange 14.

The upper flange 8 can include an upper portion configured to be retained within and/or coupled to the lower portion of the work surface 9 via a flange retention opening 9*a* defined in the lower side of the work surface 9 opposite its top surface. The flange retention opening 9a can be sized and configured to matingly interlock with the upper flange 8. Additionally (or as an alternative), the work surface 9 can be structured so that one or more fasteners can extend from the lower flange 14, through the upper flange 8 and into the work surface 9 for attachment of the arm 6 to the work surface 9.

The upper flange 8 can include an opening 8a that is sized to receive the upper portion 13a of the axle member 13. When the rotatable connection mechanism 12 is assembled for attachment of the work surface 9 to the upper portion 6u of the arm, the upper flange 8 can be positioned above the upper portion 13a of the axle member 13 and within the flange retention opening 9a and interlocked and/or affixed therein. The lower flange 14 can be positioned below the upper portion 13a of the axle member 13 so that the upper portion 13a of the axle member 13 is between the lower flange 14 and the upper flange 8. In this position, the upper portion 13a of the axle member 13 can be within the opening 8a of the upper flange and above the body of the lower flange 14. The lower portion 13b of the axle member 13 can pass through the inner annular opening 14a of the lower flange and be positioned within the opening of the upper portion 6u of the arm that is in communication with the passageway 6pw. The lower portion 13b of the axle member 13 can be attached therein (e.g. adhered therein, bonded therein, welded therein, matingly interlocked therein, and/or otherwise attached therein).

One or more fasteners (e.g. bolts, screws, nails, rivets, etc.) can extend from the body of the lower flange 14 to the work surface 9 so that an intermediate portion of each fastener passes through the body of the upper flange 8 for attachment to the work surface 9. In an alternative arrangement, the upper flange 8 can be matingly interlocked within the upper flange retention opening 9a of the work surface and be adhered, bonded, have an interference fit, and/or a combination thereof for attachment to the upper flange and the one or more fasteners can extend between the upper flange 8 and lower flange 14 for attachment of the work surface to the axle member 13 such that the work surface 9, upper flange 8, and lower flange 14 can rotate about the axle member 13 (e.g. rotate about the rotational axis defined by the upper portion 13a of the axle member 13).

One or more friction washers 19fw can be positioned to encircle or otherwise contact the lower portion 13b of the axle member 13 and/or one or more friction washers 19fw can be positioned to encircle or otherwise contact the upper portion 13a of the axle member 13 to contact or engage the upper flange 8 and/or lower flange 14 to increase the friction induced when the flanges 8 and 14 rotate about the axle member 13 for rotation of the work surface 13. The increased friction induced by such friction washer(s) 19fw can make it more difficult to rotate the work surface so that accidental or incidental contact a user may make with the work surface 9 does not result in rotation of the work surface 9. It can also make it easier for a user to position the work surface 9 to a desired orientation and maintain that position of the work surface 9.

A friction screw or friction bolt can also be passed between the axle member 13, and the lower flange 14. The friction screw or bolt can be adjusted so it brings the lower flange 14 and upper portion 13a of the axle member 13 into tighter or looser arrangement. Loosening of coupling between the upper portion 13a of the axle member 13 and the lower flange 14 via rotation of the friction screw or friction bolt in a first rotational direction can reduce the friction induced via rotation of the work surface 9. Rotation in an opposite second direction of the friction screw or bolt can provide a tighter coupling between the lower flange 13 and upper portion 13 of the axle member 13 that increases the induced friction. For instance, in some embodiments a friction screw or bolt can be in threaded contact with the lower flange 14 and upper portion 13a of the axle member 13 to provide additional adjustable friction that can be applied when the work surface 9 is rotated. The amount of friction applied can be adjusted by rotation of the friction screw or bolt in different directions as discussed herein. This adjustment can adjust a level of engagement the friction screw or bolt has that affects an amount of force needed for rotation of the work surface about the upper portion 6u of the arm 6. Embodiments can utilize the friction screw or bolt in addition to one or more friction washers 19fw to supplement the functionality provided by the one or more friction washers 19fw or can be utilized as an alternative to utilization of one or more friction washers 19fw.

In some embodiments, the flange retention opening 9a of the work surface 9 can be sized so that the upper portion 13a of the axle member 13, lower flange 14, and upper flange 8 are all retained therein. An upper end portion of the upper portion 6u of the arm 6 can also be within the flange retention opening or can be located below and outside of the opening. The charging port 5 can be spaced apart from and positioned below the work surface 9 such that the work surface 9 is rotatable without contacting the charging port retention portion 6a of the arm 6.

It should be understood that other modifications to the article of furniture 1 and/or charging port assembly 7 can be made to meet a particular set of design criteria. For example, the size and shape of various structures and the attachment mechanisms used to interconnect different elements can be adjusted to meet a particular set of design criteria. As another example, it is contemplated that a particular feature described, either individually or as part of an embodiment, can be combined with other individually described features, or parts of other embodiments. The elements and acts of the various embodiments described herein can therefore be combined to provide further embodiments.

As another example, the size, shape and weight of the arm 6, work surface 9, axle member 13, upper flange 8, lower flange 14, friction washer(s) 19fw, base 2, seat 4a friction screw or bolt, and/or or back 4b can be any size or shape to meet a particular set of design criteria. As yet another example, use of a covering and/or the extent to which a covering may cover an exterior surface of a seat or back can be adjusted as needed to meet particular design criteria and/or to provide a desired aesthetic effect (e.g. colored film to cover a foam or cushion body, no use of a covering, use of a leather covering, use of decorative paint, film, or other arrangement, etc.). As yet another example, the type of mounting connection mechanism that is utilized in an embodiment of the charging port assembly 7 for attachment of the assembly to the base 2 may be any type of connector structure geometry that may facilitate use of a pre-selected fastening mechanism for attachment of the arm 6 to the base 2 to meet a particular set of design criteria. As yet another example, the work surface attachment mechanism used to attach the work surface 9 to the arm 6 can be any type of connection structure that may meet a particular set of design criteria.

Therefore, while certain exemplary embodiments of furniture and a charging port assembly for furniture and methods of making and using the same have been discussed and illustrated herein, it is to be distinctly understood that the invention is not limited thereto but may be otherwise variously embodied and practiced within the scope of the following claims.

What is claimed is:

1. An article of furniture comprising:
   a base;
   at least one seat supported by the base;
   at least one charging port assembly attached to the base, the charging port assembly comprising:
   an arm;
   a work surface attached to an upper portion of the arm; and
   a charging port attached to the arm below the work surface;
   wherein the arm is cantilevered such that a lower portion of the arm extends horizontally and vertically from the base of the article of furniture and the upper portion of the arm extends vertically above the lower portion of the arm.

2. The article of furniture of claim 1, wherein the work surface is rotatably attached to the upper portion of the arm.

3. The article of furniture of claim 1, wherein the work surface is positioned above the at least one seat.

4. The article of furniture of claim 1, also comprising:
   a first back supported by the base to support a back of a user sitting on a first seat of the at least one seat.

5. The article of furniture of claim 1, wherein the article of furniture is a sofa or couch and the at least one seat includes a first seat and a second seat, the arm being attached to the base between the first seat and the second seat.

6. The article of furniture of claim 1, wherein the arm includes:
   a charging port retention portion positioned between the lower portion of the arm and an upper end of the upper portion of the arm, the charging port retention portion having an opening to receive and retain the charging port therein, the opening of the charging port retention portion being in communication with a channel of the arm that extends to a lower end of the lower portion of the arm.

7. The article of furniture of claim 6, wherein the channel is sized and configured to retain a portion of a power cord extending from the charging port.

8. The article of furniture of claim 7, wherein the power cord of the charging port includes a plug at a terminal end of the power cord, the plug being positionable within an outlet of a floor or wall adjacent the article of furniture or an outlet attached to the base.

9. The article of furniture of claim 8, wherein the arm also includes a cover member that is attachable to the arm to cover the channel and enclose the portion of the power cord within the channel of the arm.

10. A charging port assembly for furniture, comprising:
    an arm;
    an upper portion of the arm attachable to a work surface; and
    a charging port retention portion of the arm being below an upper end of the upper portion, the charging port retention portion having an opening sized to retain a charging port therein;
    the arm having a channel defined therein, the channel of the arm in communication with the opening of the charging port retention portion so that a power cord of the charging port is passable through the channel;
    a cover member attachable to the arm to cover the channel; and
    wherein the arm is a cantilevered arm, a lower portion of the arm defining the channel, the lower portion of the arm extending vertically and horizontally to the upper portion of the arm, the upper portion of the arm extending vertically.

11. A charging port assembly for furniture, comprising:
    an arm;
    an upper portion of the arm attachable to a work surface; and
    a charging port retention portion of the arm being below an upper end of the upper portion, the charging port retention portion having an opening sized to retain a charging port therein;
    the arm having a channel defined therein, the channel of the arm in communication with the opening of the charging port retention portion so that a power cord of the charging port is passable through the channel;
    a cover member attachable to the arm to cover the channel; and
    a rotational connection mechanism attached to an upper end of the upper portion of the arm to rotatably attach the work surface to the arm.

12. The charging port assembly of claim 11, wherein the rotational connection mechanism comprises:
    an axle member having a lower portion positionable within an opening of the upper end of the upper portion of the arm and an upper portion that is positioned above the upper end of the upper portion of the arm, the work surface being rotatable about the upper portion of the axle member.

13. The charging port assembly of claim 12, wherein the rotational connection mechanism also comprises:
    an upper flange positioned between the work surface and the axle member, the upper flange retainable within a flange retention opening defined within a bottom of the work surface.

14. The charging port assembly of claim 13, wherein the rotational connection mechanism also comprises:
    a lower flange positioned below the upper portion of the axle member so that the upper portion of the axle member is between the upper flange and the lower flange, the lower flange being attachable to the upper flange and/or the work surface such that the work surface is rotatable about the axle member.

15. The charging port assembly of claim 12, wherein the rotational connection mechanism also comprises:
    a lower flange positioned below the upper portion of the axle member so that the upper portion of the axle member is between the upper flange and the work surface, the lower flange being attachable to the work surface such that the work surface is rotatable about the axle member.

16. The charging port assembly of claim 12, wherein the work surface has an opening defined in a bottom of the work surface, at least one of a lower flange, an upper flange and the upper portion of the axle member being retained within the opening of the bottom of the work surface such that the work surface is rotatable about the upper portion of the axle member.

17. The charging port assembly of claim 16, wherein:
    the lower flange is positioned below the upper portion of the axle member so that the upper portion of the axle member is between the upper flange and the work surface, the lower flange being attachable to the work surface such that the work surface is rotatable about the upper portion of the axle member; and/or the upper flange positioned between the work surface and the axle member, the upper flange retainable within the retention opening defined within the bottom of the work surface, the upper flange being attachable to the work surface such that the work surface is rotatable about the upper portion of the axle member.

18. A method of installing a charging port assembly onto furniture, the method comprising:

providing an arm, an upper portion of the arm attachable to a work surface, a charging port retention portion of the arm being below an upper end of the upper portion, the charging port retention portion having an opening sized to retain a charging port therein; the arm having a channel defined therein, the channel of the arm being in communication with the opening of the charging port retention portion so that a power cord of the charging port is passable through the channel, wherein the arm is cantilevered such that a lower portion of the arm extends horizontally and vertically from the base of the article of furniture and the upper portion of the arm extends vertically above the lower portion of the arm;

routing the power cord through the opening of the charging port retention port and through the channel;

inserting the charging port into the opening of the charging port retention portion to attach the charging port to the charging port retention portion of the arm;

attaching a cover member to the arm to cover a portion of the power cord within the channel of the arm; and attaching the lower portion of the arm to a base of an article of furniture so that the arm is positioned adjacent to a seat supported by the base.

19. The method of claim 18, comprising:

coupling the plug of the power cord within an outlet adjacent to the article of furniture or attached to the base of the article of furniture.

20. The method of claim 18, comprising:

attaching the work surface to the upper end of the upper portion of the arm so that the work surface is above the charging port.

* * * * *